(12) United States Patent
Costa Pereira et al.

(10) Patent No.: US 6,179,029 B1
(45) Date of Patent: Jan. 30, 2001

(54) TIRE HAVING AN IMPROVED CARCASS

(75) Inventors: Pedro Costa Pereira; Jacques Barraud, both of Clermont-Ferrand; Jean-Yves Denoueix, Blanzat; Bernard Guerinon, Clermont-Ferrand; Yves Herbelleau, Riom, all of (FR)

(73) Assignee: Compagnie Générale des Etablissements Michelin - Michelin & Cie

( * ) Notice: Under 35 U.S.C. 154(b), the term of this patent shall be extended for 0 days.

(21) Appl. No.: 09/054,024

(22) Filed: Apr. 2, 1998

Related U.S. Application Data
(60) Provisional application No. 60/058,349, filed on Sep. 10, 1997.

(30) Foreign Application Priority Data

Apr. 2, 1997 (FR) ................................. 97 04246

(51) Int. Cl.$^7$ .................................................. B60C 13/00
(52) U.S. Cl. .................... 152/525; 152/539; 152/541; 152/547; 152/550; 152/564
(58) Field of Search .................... 152/539, 541, 152/525, 547, 548, 564, 550

(56) References Cited

U.S. PATENT DOCUMENTS

| | | | |
|---|---|---|---|
| 3,172,445 | * 3/1965 | Boussu et al. | 152/554 |
| 4,531,561 | 7/1985 | Ippen et al. . | |
| 5,526,863 | * 6/1996 | Hodges | 152/539 |
| 5,660,656 | 8/1997 | Herbelleau et al. . | |
| 5,702,548 | 12/1997 | Arnaud et al. . | |

FOREIGN PATENT DOCUMENTS

| | | |
|---|---|---|
| 0066225 | 5/1982 | (EP) . |
| 0751015 | 1/1997 | (EP) . |
| 990524 | 4/1965 | (GB) . |
| 4-278803 | 10/1992 | (JP) . |
| 8-002218 | 1/1996 | (JP) . |

* cited by examiner

Primary Examiner—Michael W. Ball
Assistant Examiner—Barbara J. Musser
(74) Attorney, Agent, or Firm—Baker Botts L.L.P.

(57) ABSTRACT

A tire wherein the reinforcing cords of the carcass, in the part situated between the anchoring zone of the carcass and the sidewall, are in contact with at least one layer of cushion compound having a high modulus of elasticity on the axially outer side and a low modulus of elasticity on the axially inner side and in the sidewall.

7 Claims, 7 Drawing Sheets

TIRE HAVING AN IMPROVED CARCASS

This application is based on provisional application Ser. No. 60/058,349 filed Sep. 10, 1997.

BACKGROUND OF INVENTION

The invention relates to the sidewalls and the beads of tires and, more particularly, the cushion compounds in contact with the reinforcing cords of the carcass or carcasses anchored in the beads.

The beads of tires are rigid parts which function to seat the tire on the rim and anchor the carcasses. Their contact with the rim, particularly the rim flanges, must be made, during travel, with a minimum of slippage to reduce wear due to rubbing against the rim. The sidewalls, on the other hand, are very flexible. It is important to avoid any sudden variation in rigidity between the beads and the sidewalls, particularly to ensure good endurance of the tires. Thus the beads may be considered to comprise two parts, an anchoring zone whose walls are designed to come into contact with the seat and the flange of the rim and, radially outwardly, a transition zone adjacent to the sidewalls. The anchoring means of the carcasses are arranged in the anchoring zone of the bead.

European Patent 0,582,196 discloses a tire comprising a tread extended by two sidewalls and two beads, as well as a carcass anchored in the two beads and having an annular reinforcement. The carcass is made up of cords arranged in adjacent fashion, aligned circumferentially and in contact with at least one layer of cushion compound having a very high modulus of elasticity in the anchoring zone of the bead that contains the annular reinforcement. In this tire, the annular reinforcement of the anchoring zone of the bead is made up of piles of circumferential cords with a layer of cushion compound of high modules or elasticity interposed between the reinforcing cords of the carcass and said piles.

The mode of anchoring of the carcass of this tire has the advantage of avoiding a sudden variation in rigidity due to the turn-up end of the carcass. The change in rigidity between the anchoring zone of the carcass and the sidewalls can thus be much more gradual.

SUMMARY OF THE INVENTION

The subject of the invention is a tire in which the structure of the beads and the sidewalls is further perfected to improve its quality and performance without complicating its manufacture.

In the following, "cord" is understood to mean both monofilaments and multifilaments, or assemblies such as cables, twists or any other type of equivalent assemblies, and this, regardless of the material or treatment of these cords, for example, surface treatment or coating or preglueing to promote adhesion to the rubber.

"Layer of cushion compound" for a given reinforcing ply is understood to mean the rubber blend in contact with the reinforcing cords of the ply, adhering to these and filling the interstices between adjacent cords. In current industrial practice, for a given carcass ply, the same quality of cushion compounds is used for the various zones of the tire.

"Contact" between a cord and a layer of cushion compound is understood to mean that at least part of the outer circumference of the cord is in intimate contact with the rubber blend constituting the cushion compound.

"Sidewalls" are the regions of the tire having little flexural strength situated between the crown and the beads. "Sidewall blends" are the rubber blends situated axially outwardly in relation to the reinforcing cords of the carcass and to their cushion compounds. These blends have a low modulus of elasticity. The sidewalls usually have no reinforcement other than the carcass.

The part of the tire adjacent radially inwardly to the sidewall is called the "bead." Two zones or regions may be distinguished in a bead, an "anchoring zone" whose radially inner and axially outer walls are designed to come into contact, when the tire is in use, with a seat and a flange of the rim and, radially outwardly, a "transition zone" adjacent to the sidewall. The anchoring means of the carcasses are also arranged in the anchoring zone. These means are usually an annular reinforcement which may be a rod, piles of circumferential cords or any other means.

The transition zone of the bead constitutes an intermediate part between the anchoring zone and the sidewall whose flexural rigidity diminishes progressively as the sidewall is approached. This region comprises, in particular, bead filling rubbers called "bead fillers". Conventionally in this transition zone of the bead a sidewall blend constitutes the outermost protection against mechanical and atmospheric attacks. It would be advisable for the demarcation between the transition zone of the bead and the sidewall to correspond to the radially outer limit of the fillers. The demarcation between the transition and anchoring zones of the bead corresponds radially to the radial height of the flange of the rim on which the tire is designed to be mounted. However, when annular reinforcing elements go beyond this radial limit, it would be advisable that the limit between the transition and anchoring zones of the bead correspond to the radially outer limit of the annular reinforcement anchoring the carcass.

"Modulus of elasticity" of a rubber blend is understood to mean a modulus of secant extension obtained at a deformation of uniaxial extension of about 10% at ambient temperature.

The tire according to the invention comprises a tread extended by two sidewalls and two beads, each bead having an anchoring zone and a transition zone, as well as a carcass anchored in the two beads, the said carcass being made up of cords. This tire is characterized in that, in at least part of the said transition zone of the beads, the reinforcing cords of the carcass arranged axially furthest toward the outside in the tire are in contact, on the axially outward side of the said cords, with a layer of cushion compounds having a given modulus of elasticity and the reinforcing cords of the carcass arranged axially furthest inwardly in the tire are in contact, on the side toward the inside of the tire, with a layer of cushion compounds having a lower modulus of elasticity and in that, in at least part of the said sidewalls, the reinforcing cords of the carcass arranged axially furthest outwardly in the tire are in contact, on the side of the said cords toward the outside of the tire, with a layer of cushion compounds having a modulus of elasticity lower than that of the said layer of cushion compounds having a given modulus of elasticity and the reinforcing cords of the carcass arranged axially furthest inwardly in the tire are in contact, on the side toward the inside of the tire, with a layer of cushion compounds having a modulus of elasticity lower than that of the said layer of cushion compounds having a given modulus of elasticity.

Preferably, the layer of cushion compounds having a given modulus of elasticity has a modulus of elasticity which may range from medium to very high.

The layer of cushion compounds having a given modulus of elasticity situated in the transition zone of the beads on the axially outer side of the tire in relation to the carcass reinforcing cords has the advantage of cooperating with said reinforcing cords to obtain a high circumferential rigidity of the whole. Such high rigidity helps to limit slippage between the outer wall of the bead and the rim flange during travel without penalizing the endurance of the bead on the inner side of the reinforcing cords of the carcass where the layers of cushion compounds are subjected to appreciable stresses of radial extension. This results in a marked gain in endurance of the tire.

According to a preferred embodiment of the invention, in at least part of the transition zone of the bead, the layers of cushion compounds in contact with the reinforcing cords of the carcass arranged axially furthest outwardly in the tire, on the side of the said cords toward the outside of the tire, are made up of at least one bead filler blend axially adjacent the outer side of the said reinforcing cords.

This embodiment provides a complementary role for the bead fillers concerned, that of rubber bonding with the reinforcing cords of the carcass. Reduction of the diversity of blends simplifies manufacture of the tire without sacrificing performance due to the proposed architecture of the tire.

Advantageously, the layers of cushion compounds in contact with the reinforcing cords of the carcass on the side of the said cords toward the outside of the tire are made up of at least two bead fillers having unlike moduli of elasticity and adjacent axially outwardly to the said reinforcing cords, the zone of contact between the bead fillers having a lower modulus of elasticity and the reinforcing cords being staggered axially outwardly in relation to the zone of contact between the bead fillers having a high modulus of elasticity and the reinforcing cords.

The bead fillers having a lower modulus of elasticity and adjacent outwardly to the reinforcing cords of the carcass may have a medium or high modulus of elasticity. The bead filler having a higher modulus of elasticity and adjacent outwardly of the reinforcing cords of the carcass may have a high or very high modulus of elasticity.

DESCRIPTION OF THE DRAWINGS

The invention is now described with the aid of the accompanying drawing, wherein.

DESCRIPTION OF PREFERRED EMBODIMENTS

Figure 1:
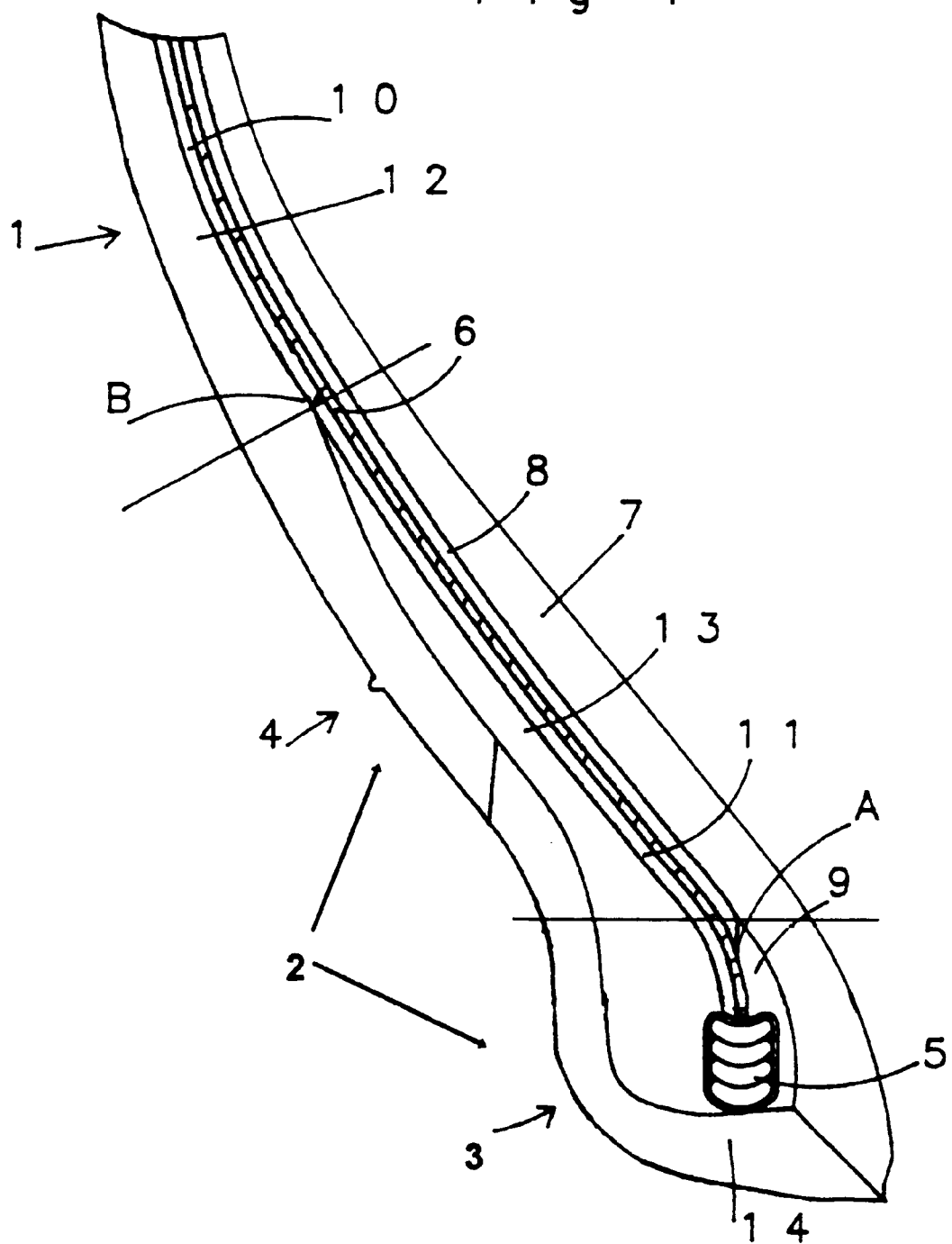
FIG. 1 shows, in partial cross section, a bead and a sidewall of a tire according to the invention.

A bead and a sidewall of a tire according to the invention are shown, in partial cross section, in FIG. 1. The tire comprises a sidewall 1 adjacent to a bead 2. The bead 2 has an anchoring zone 3 and a transition zone 4 adjacent to the sidewall 1. The anchoring zone comprises a rod 5 about which is anchored a carcass 6. The reinforcing cords of the carcass 6 form loops that surround the rod 5, which makes the presence of a traditional turn-up of the carcass in the bead unnecessary. Such a carcass may be achieved in particular with the devices described in European Patent 0,243,851. The division indicated between the anchoring zone 3 and the transition zone 4 corresponds substantially to the radial height of the flange of the rim on which the tire is designed to be mounted. The reference numeral 7 corresponds to a combination of blends arranged over the whole of the inner wall of the tire, which usually includes a gastight blend called "interior rubber". Then there is a first layer of rubber cushion compound 8 of the reinforcing cords of the carcass 6. The layer 8 is arranged axially inwardly in relation to the carcass 6 and extends along the whole of the sidewall 1 and along the transition zone 4 to a point A located radially above the rod 5 in the anchoring zone and substantially to the demarcation between said anchoring zone and the transition zone. The layer 8 has a low modulus of elasticity. The reinforcing cords of the carcass 6 are then axially inwardly in contact with a rubber blend 9 having a high modulus of elasticity. The point of contact A between the layers 8 and 9 is always situated in a zone where the amplitude of radial extensions under various travel demands remains very low. Preferably, the radial distance between point A and the lower wall of the anchoring zone 3 of the bead 2 is less than the radial height of the flange of the rim designed to receive the tire according to the invention.

On the axially outer side of the carcass 6, there is a layer of cushion compound 10 having a low modulus of elasticity. Said layer 10 extends over the whole of the sidewall 1. Then there is a layer of cushion compound 11 having a high modulus of elasticity which extends along the entire transition zone 4 of the bead 2. Axially outwardly in relation to the layer 10, there is a sidewall blend 12 having a low modulus of elasticity. Axially outwardly in relation to the layer 11, there is a bead filler 13 having a high modulus of elasticity. The point B, which separates the sidewall and the transition zone 4 of the bead 2, corresponds substantially to the point at which the bead filler 13 stops radially. The sidewall blend 12 extends radially into the transition zone 4 of the bead 2 axially outwardly in relation to the bead filler 13. This structure makes it possible to achieve excellent progression in the rigidity between the bead and the sidewall, which results in excellent strength and endurance in this part of the tire. In the radially lower part of the transition zone 4 and in the anchoring zone of the bead 2 there is, lastly, a blend 14 having a medium modulus of elasticity designed to come into contact with the flange and seat of the rim. This blend is usually specially designed to offer very good resistance to wear resulting from contact with the flange and seat of the rim.

Figure 2:
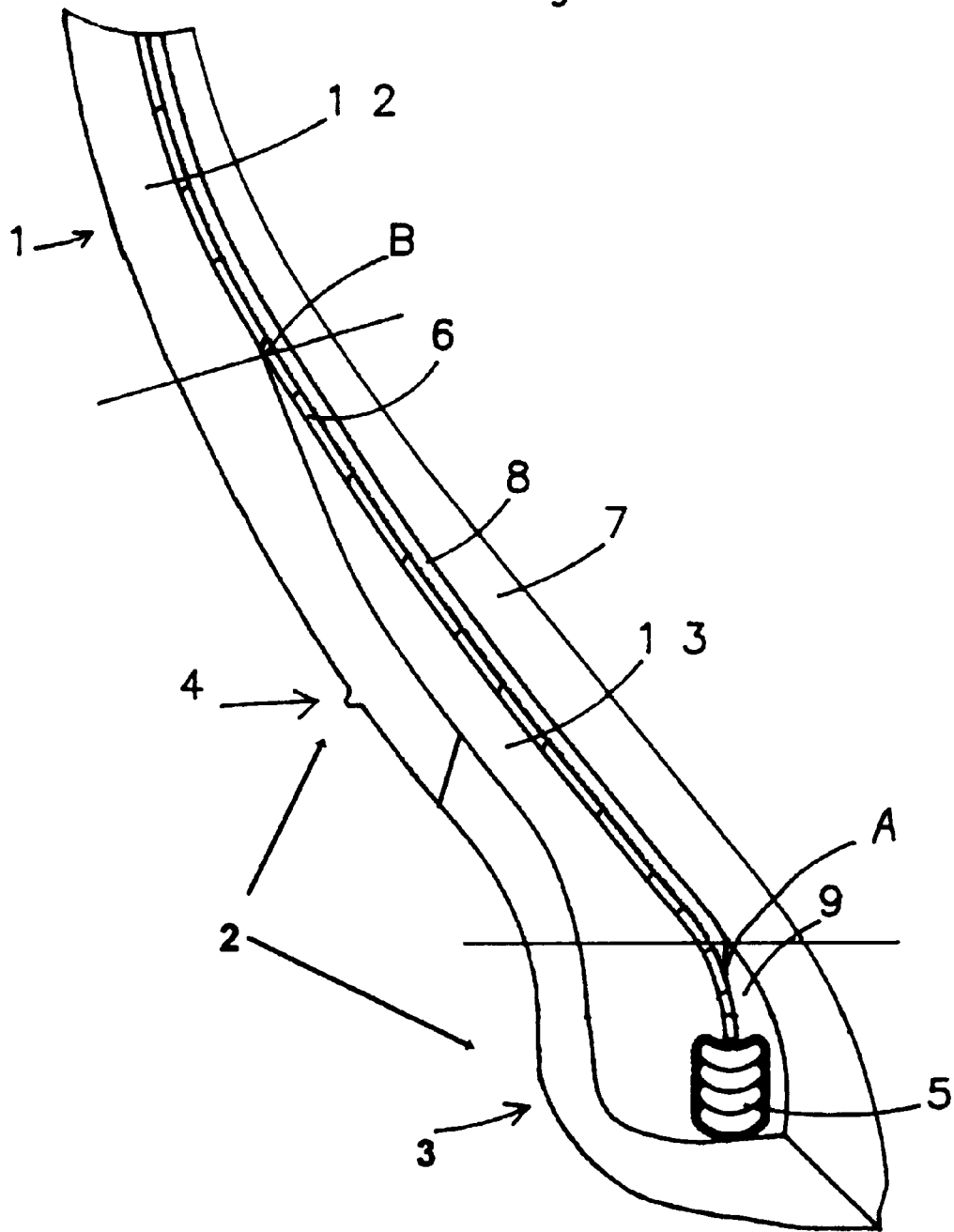
FIG. 2 shows a variant of the tire of FIG. 1.

FIG. 2 shows a variant of the tire of FIG. 1. In this variant, the layers of cushion compounds of the reinforcing cords of the carcass 6 are constituted of the axially inner wall of sidewall blend 12 and bead filler 13. Thus there is no specific layer of cushion compound on the axially outer side of the carcass 6. This structure makes it possible to obtain excellent impregnation of the reinforcing cords of the carcass 6 by the blends 12 and 13 at the time of curing of the tire while retaining excellent performance of longitudinal rigidity in the transition zone 4 of the bead 2. This structure also has the advantage of reducing the number of layers of rubber blends to be put into place at the time of fabrication of the tire, which is very important for reducing its cost of manufacture.

In the first embodiment illustrated by FIGS. 1 and 2, the blends having a low modulus of elasticity have a modulus of elasticity of less than 6 MPa and preferably between 2 and 5 MPa. The blends having a high modulus of elasticity have a modulus of between 12 and 25 MPa. The layers 9 and 11 may also have a very high modulus of elasticity, greater than 25 MPa, even greater than 30 MPa.

Figure 3:
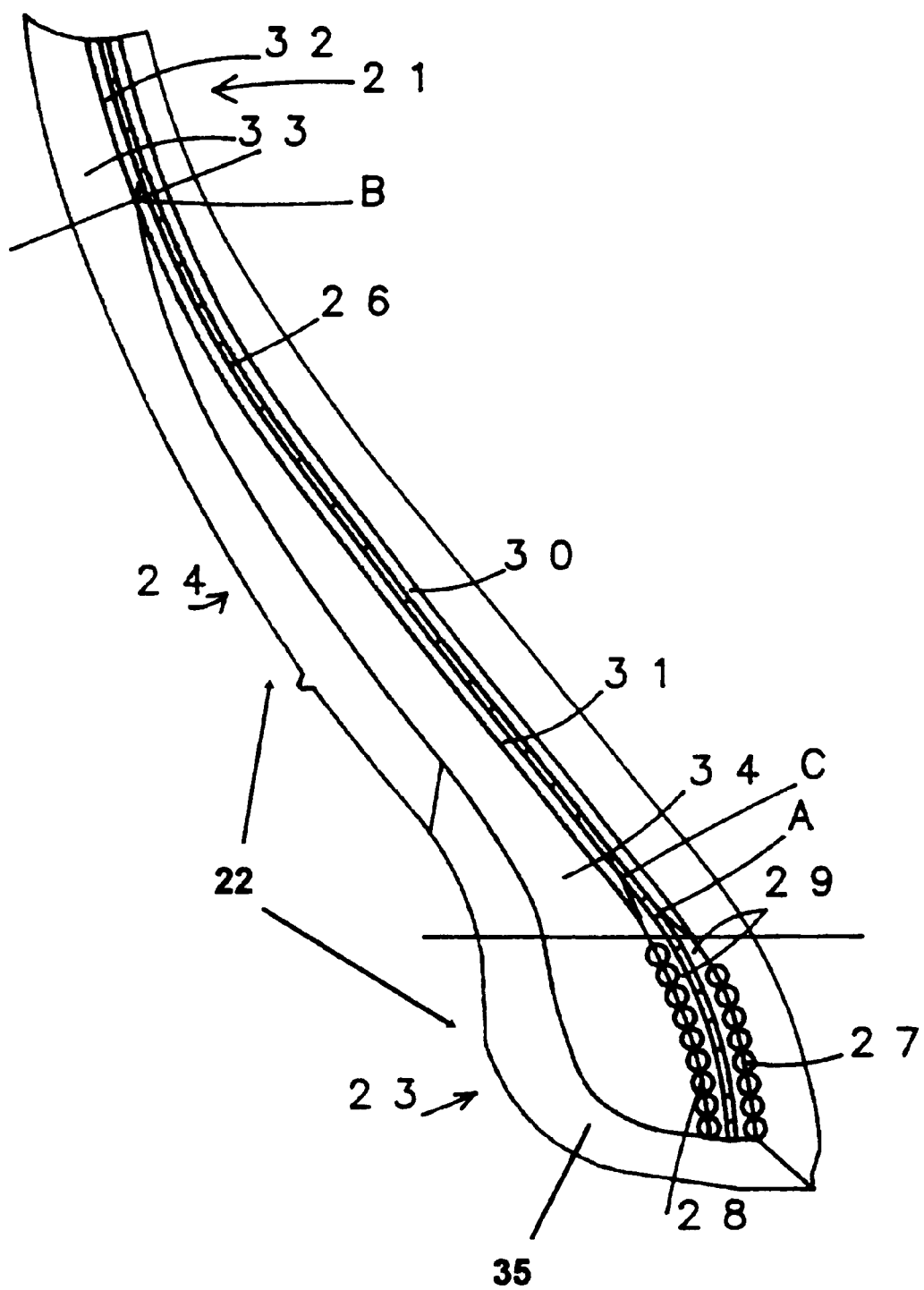
FIG. 3 shows a second embodiment of a tire according to the invention.

Another embodiment of a tire according to the invention, whose structure is close to that described in European Patent 0,582,196, is shown in FIG. 3. In this tire, the carcass 26 is anchored in the anchoring zone 23 of the bead 22 by piles 27, 28 of circumferential cords with interposition, between said piles and the reinforcing cords of the carcass 26, of a layer of cushion compound 29 having a very high modulus of elasticity, i.e., having a modulus of elasticity greater than 25 MPa and preferably greater than 30 MPa. In particular, such a carcass may be achieved with the devices described in European Patent 0,580,055. Then the layers of cushion compounds of the reinforcing cords of the carcass 26 in the anchoring zone 23 of the bead 22 are composed of the blend 29 having a very high modulus of elasticity. In the radially lower part of the transition zone 24 and in the anchoring zone 23 of the bead 22, there is a blend 35 having a medium modulus of elasticity 35 designed to come into contact with the flange and seat of the rim. This blend is usually specially designed to offer very good wear resistance.

On the axially inner side, starting from point A, the radially outer limit of the layer of cushion compound 29 having a very high modulus of elasticity, there is, as before, a layer of cushion compound 30 having a low modulus of elasticity which extends radially over practically the whole of the transition zone 24 of the bead 22 and over the entire sidewall 21.

On the radially outer side, starting from point C, the radially outer limit of the layer of cushion compound 29 having a very high modulus of elasticity, there is, as before, a layer of cushion compound 31 having a high or medium modulus of elasticity which extends radially over practically the whole of the transition zone 24 of the bead 22 until substantially the point B, where the sidewall 21 begins. The demarcation between the layer 31 and the layer 32 having a medium or low modulus of elasticity is situated preferably at B, but may alternatively be staggered on one side and the other by several millimeters. In other embodiments of the invention, this demarcation may alternatively be situated substantially lower radially. In the sidewall 21, the layer of cushion compound 32 consists of a blend having a medium or low modulus of elasticity. In this example, the layer 31 having a high modulus of elasticity has a modulus of elasticity of between 12 and 25 MPa. The layer 32 has a modulus of below 6 MPa and preferably between 2 and 5 MPa (low modulus of elasticity) or between 6 and 12 MPa (medium modulus of elasticity). When the layer 31 has a medium modulus of elasticity, the layer 32 has a low modulus of elasticity, and when the layer 31 has a high modulus of elasticity, the layer 32 may have a medium or low modulus of elasticity, as the case may be.

In the example shown, points A and C are located in the transition zone 24 of the bead 22. Depending upon the case, they may alternatively be located at the demarcation between the anchoring zone 23 and the transition zone 24 or in the anchoring zone 23 of the bead 22.

Figure 4:
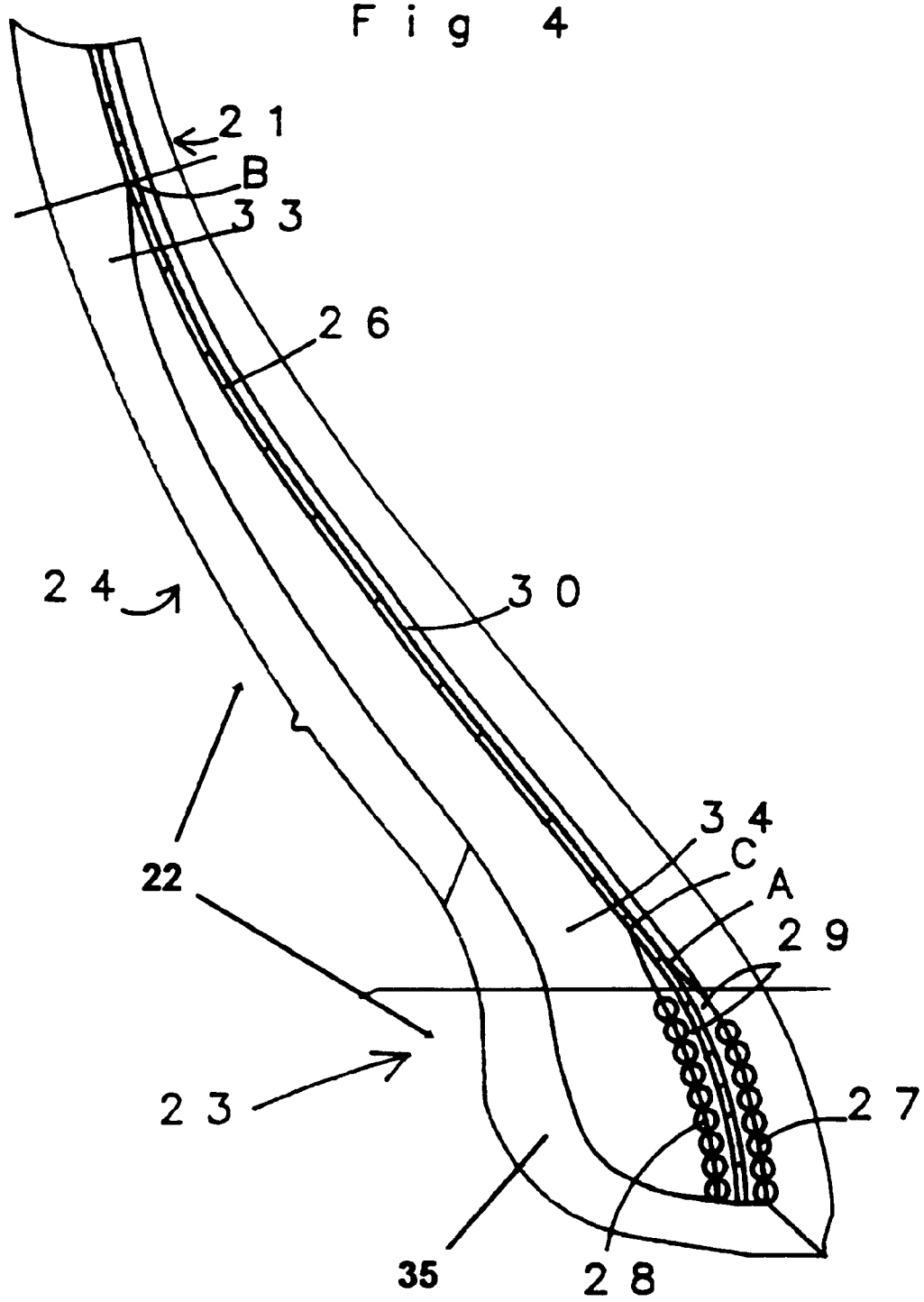
FIG. 4 shows a variant of the tire of FIG. 3.

FIG. 4 shows a variant embodiment of the tire of FIG. 3 wherein the layers of cushion compounds arranged axially outwardly of the reinforcing cords of the carcass 26 are made up of the sidewall blends 33 having a low modulus of elasticity and of filler 34 having a high modulus of elasticity. As before, this variant is very advantageous for facilitating fabrication of the tire.

Tests on 185/65×14 tires have shown that replacement in the transition zone of the beads, on the side of the carcass-reinforcing cords axially toward the outside of the tire, of cushion compounds having a low modulus by a cushion compounds having a high modulus of elasticity made as in the examples illustrated in FIGS. 1 to 4, permitted an increase of more than 10% in the longitudinal and transverse rigidities of the tire.

Figure 5:
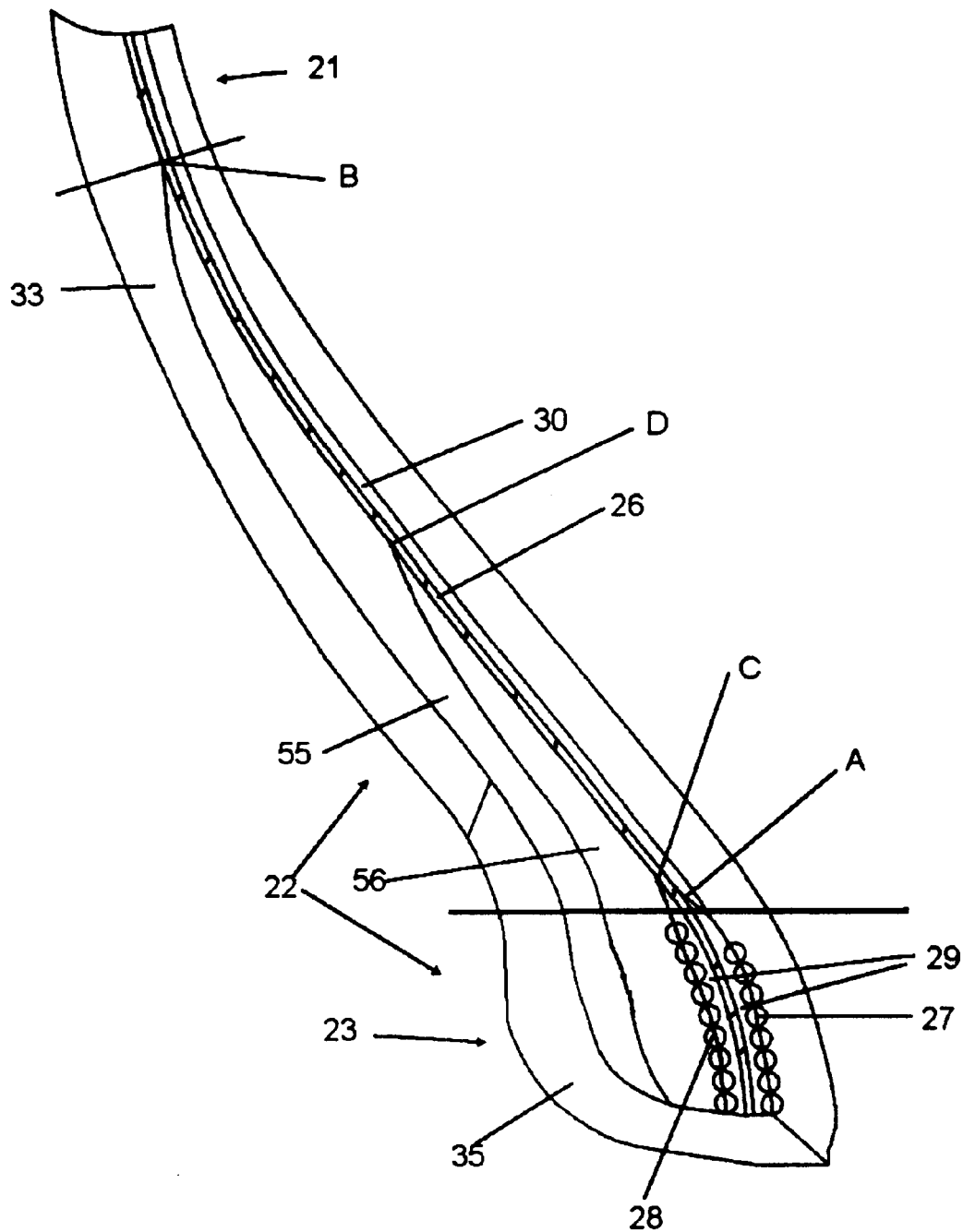
FIG. 5 shows a second variant of the tire of FIG. 3.

FIG. 5 shows a second variant of the tire of FIG. 4. The reinforcing cords of the carcass 26 are in contact, successively, from the anchoring zone to the sidewalls, on the side toward the outside of the tire, with a first blend 29 having a very high modulus of elasticity, then with a first filler 56 having a high modulus of elasticity (from C to D), then with a second filler 55 having a medium modulus of elasticity (from D to B) and lastly, in the zone of the sidewalls, with a sidewall blend 33 having a low modulus of elasticity. The zones of contact between the reinforcing cords and the two fillers having unlike moduli of elasticity are staggered radially so that the zone of contact between the filler having a high modulus of elasticity (from C to D) is the one closest to the anchoring zone of the bead. This variant has the advantage of improving the progressive decrease in flexural rigidity of the transition zone of the tire, while, as before, facilitating its manufacture by reason of the smaller number of its constituents.

Figure 6:
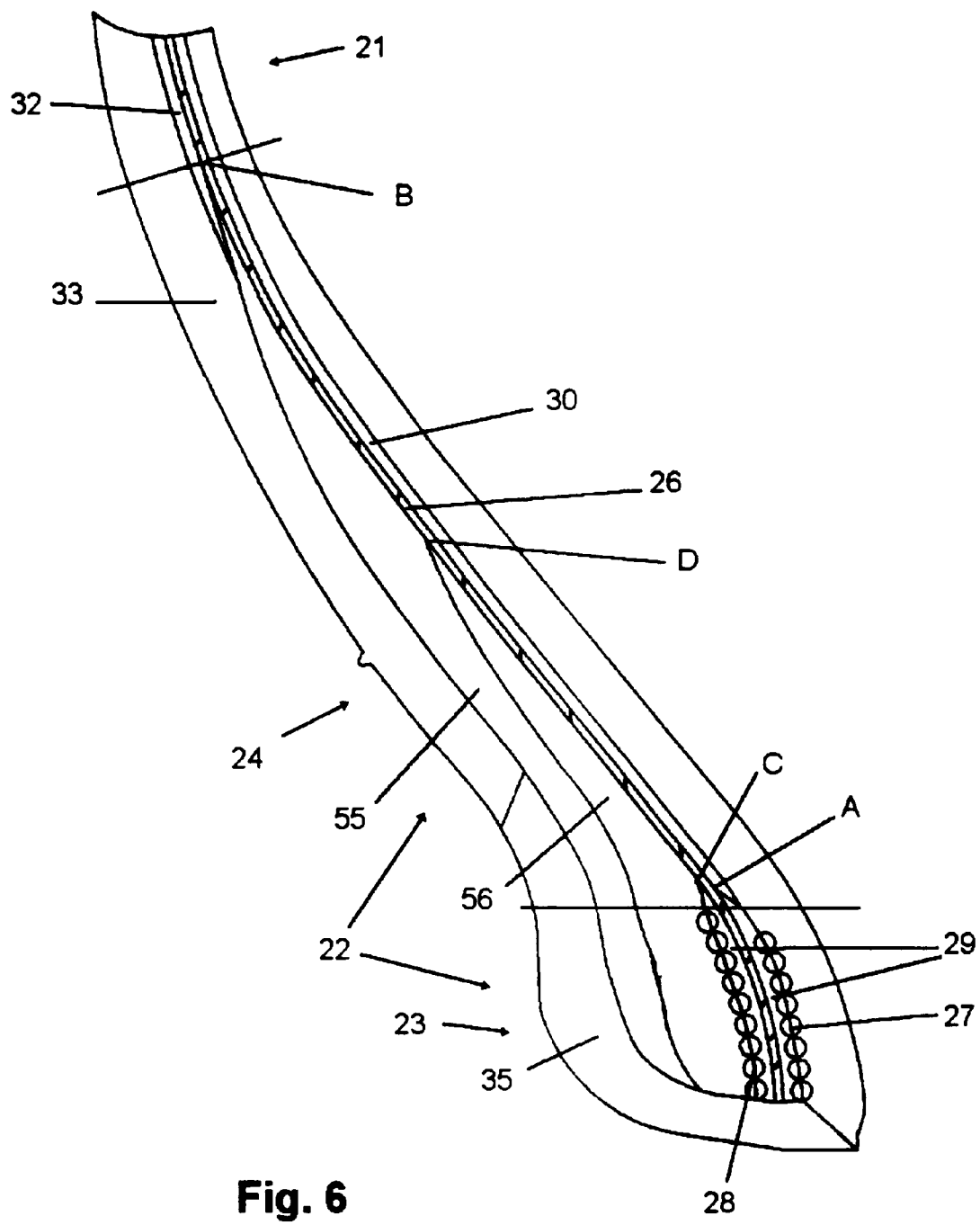
FIG. 6 shows a third variant of the tire of FIG. 3.

FIG. 6 presents another variant of the tire according to the invention, similar to that illustrated in FIG. 5. The bead of this tire is virtually identical to that of FIG. 5. The difference between these two tires is related to the fact that, in the sidewalls, there is arranged a layer 32 of cushion compound having a medium or low modulus of elasticity arranged in contact with the reinforcing cords of the carcass 26, on the side of said cords toward the outside of the tire. This layer of cushion compound 32 comes to cover the radially outer end B of the second filler 55 which serves as cushion compound in the transition zone adjacent to the sidewall.

This embodiment seems to be a regression with respect to the preceding one as concerns ease of manufacture of the tire. However, it may prove to be advantageous to include this layer of cushion compound in the sidewalls of the outer side of the reinforcing cords of the carcass because of the high cost of all the agents for protection against ozone and oxygen usually present in sidewall blends. This accomplishment may also permit optimization of adhesion to the reinforcing cords of the carcass, if necessary.

Tests of endurance of the beads—test of straight-line travel under heavy load and high inflation pressure—were performed for 185/65×14 tires corresponding to the variant embodiments shown in FIGS. 5 and 6. These tires were compared to controls comprising a layer of rubber having a low modulus of elasticity on the axially outer side of the carcass cords over all the transition zones of the beads and the sidewalls. An increase in length of service life by a factor of 3 to 4 was found for the tires corresponding to the variants of FIGS. 5 and 6.

Figure 7:
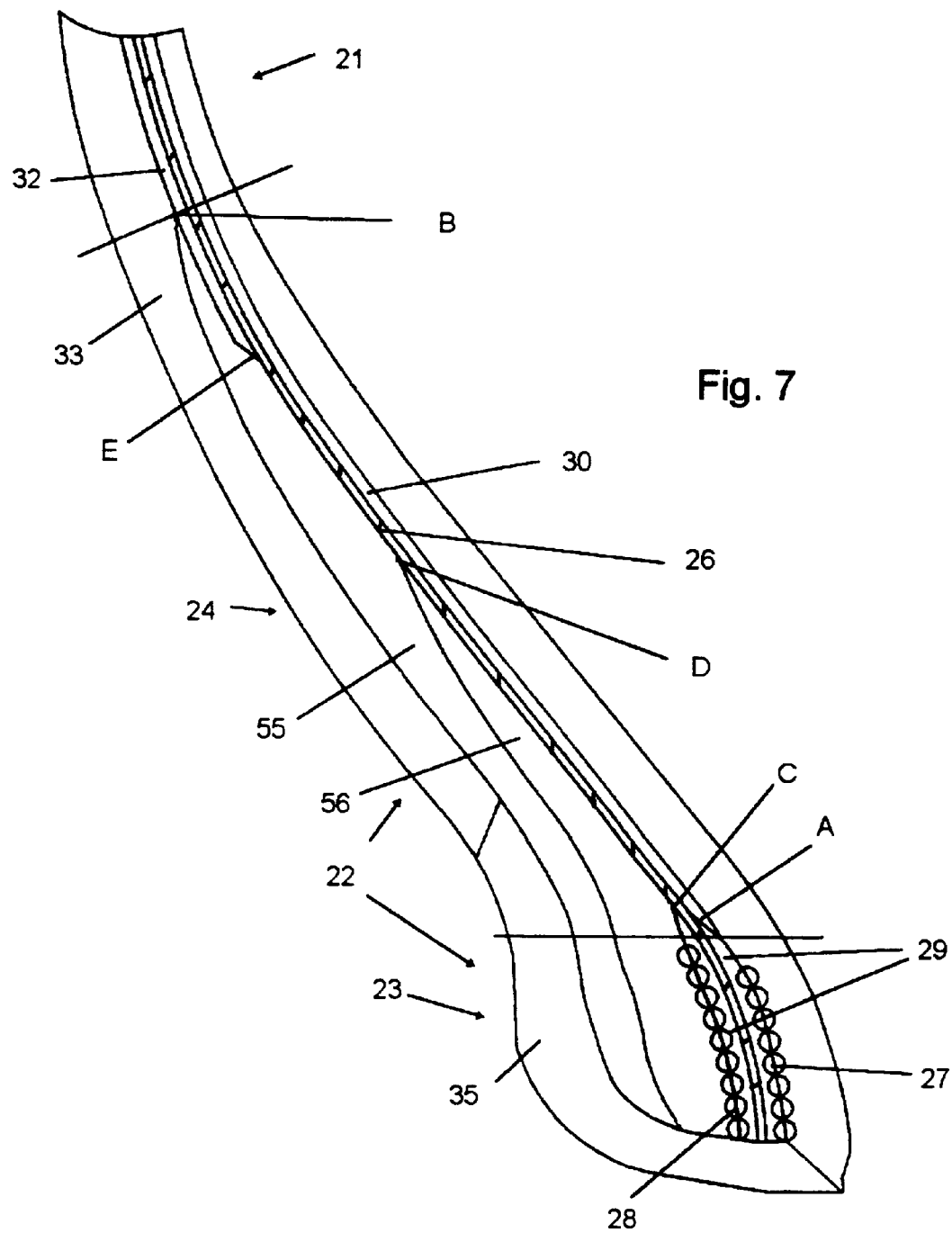
FIG. 7 shows a fourth variant of the tire of FIG. 3.

FIG. 7 presents an alternative embodiment of the tire illustrated by FIG. 6. In this embodiment, it is the radially outer end of the filler 55 which covers the radially inner end of the layer of cushion compound 32 having a medium or low modulus of elasticity arranged in contact with the reinforcing cords of the carcass 26 in the sidewalls and the side toward the outside of the tire. Consequently, in this embodiment, the radially inner limit of the layer of cushion compound having a low modulus of elasticity is situated at point E in the transition zone of the bead instead of being practically at the limit between the sidewall and the transition zone of the bead. In other embodiments, said limit E may alternatively be situated as far as the point D, i.e., from below to midway between D and C.

To produce the various tires according to the invention, it is very advantageous to make them on a rigid core which determines the shape of the inner cavity of the tire. On this core, there are applied, in the order required by the final architecture, all the constituents of the tire, which are arranged directly in their final position, without undergoing shaping at any time in manufacture. Such manufacture may employ in particular the devices described in European Patent 0,264,600 to put the rubber into position. The tire may be molded and vulcanized as described in U.S. Pat. No. 4,895,692.

The tires according to the invention may comprise a carcass composed of a single circumferential alignment of reinforcing cords anchored in the two beads of the tire, in which case the reinforcing cords of the carcass are in contact radially outwardly with the layers of cushion compounds as described above. Said tires may alternatively comprise a carcass composed of a plurality of circumferential alignments of reinforcing cords anchored in the two beads. In this case, of course, only the reinforcing cords belonging to the circumferential alignment arranged radially most outwardly in the tire or most inwardly in the tire are in contact with the layers of cushion compounds such as described above.

We claim:

1. A tire comprising a tread extended by two sidewalls and two beads, each bead having an anchoring zone and a transition zone, a carcass anchored in the two beads, the said carcass being composed of reinforcing cords wherein, in at least part of said transition zone of the beads, the reinforcing cords of the carcass arranged axially furthest outwardly in the tire are in contact, on the side of said cords toward the outside of the tire, with layers of cushion compounds composed of at least two bead fillers having unlike secant moduli of elasticity at 10% elongation, a given modulus and a lower one, said bead fillers being adjacent axially outwardly to said reinforcing cords, a zone of contact between the bead filler having a lower secant modulus of elasticity at 10% elongation and the reinforcing cords being staggered outwardly in relation to the zone of contact between the bead filler having a given secant modulus of elasticity at 10% elongation and the reinforcing cords and the reinforcing cords of the carcass arranged axially furthest inwardly in the tire are in contact, on the side toward the inside of the tire, with a layer of cushion compound having a secant modulus of elasticity at 10% lower than that of the layer of cushion compound having a given secant modulus of elasticity at 10% elongation and in that, in at least part of the said sidewalls, the reinforcing cords of the carcass arranged axially furthest outwardly in the tire are in contact, on the side of said cords toward the outside of the tire, with a layer of cushion compound having a secant modulus of elasticity at 10% elongation lower than that of the said layer of cushion compound having a given secant modulus of elasticity at 10% elongation and the reinforcing cords of the carcass arranged axially furthest inwardly in the tire are in contact, on the side toward the inside of the tire, with a layer of cushion compound having a secant modulus of elasticity at 10% elongation lower than that of the said layer of cushion compound having a given secant modulus of elasticity at 10% elongation.

2. A tire according to claim 1, wherein the bead filler having a lower secant modulus of elasticity at 10% elongation and adjacent outwardly to the reinforcing cords of the carcass has a medium secant modulus of elasticity at 10% elongation.

3. A tire according to claim 1, wherein the bead filler having a given secant modulus of elasticity at 10% elongation and adjacent outwardly to the reinforcing cords of the carcass has a high secant modulus of elasticity at 10% elongation.

4. A tire according to claim 1, wherein the bead filler having a given secant modulus of elasticity at 10% elongation and adjacent outwardly to the reinforcing cords of the carcass has a very high secant modulus of elasticity at 10% elongation.

5. A tire according to claim 1, wherein a medium secant modulus of elasticity at 10% elongation is between 6 and 12 MPa.

6. A tire according to claim 1, wherein a high secant modulus of elasticity at 10% elongation is between 12 and 25 MPa.

7. A tire according to claim 1, wherein a very high secant modulus of elasticity at 10% elongation is greater than 25 MPa.

* * * * *